United States Patent
Luft et al.

(10) Patent No.: US 7,561,675 B2
(45) Date of Patent: *Jul. 14, 2009

(54) METHOD FOR SETTING UP A COMMUNICATION LINK WITH MULTIMEDIA CALL SIGNALING

(75) Inventors: Achim Luft, Braunschweig (DE); Norbert Schwagmann, Braunschweig (DE); Markus Trauberg, Velchede (DE); Martin Wulsten, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 353 days.

This patent is subject to a terminal disclaimer.

(21) Appl. No.: 10/573,993

(22) PCT Filed: Aug. 9, 2004

(86) PCT No.: PCT/EP2004/051751
§ 371 (c)(1),
(2), (4) Date: Mar. 30, 2006

(87) PCT Pub. No.: WO2005/034493

PCT Pub. Date: Apr. 14, 2005

(65) Prior Publication Data

US 2007/0081660 A1 Apr. 12, 2007

(30) Foreign Application Priority Data

Sep. 30, 2003 (DE) ................ 103 45 444

(51) Int. Cl.
*H04M 11/00* (2006.01)
(52) U.S. Cl. ............... 379/88.13; 379/218.01; 379/355.01; 455/415; 455/435; 455/566
(58) Field of Classification Search ............. 455/415, 455/435, 566; 379/88.13, 218.01
See application file for complete search history.

(56) References Cited

U.S. PATENT DOCUMENTS 5,073,927 A * 12/1991 Grube .................. 348/14.01

(Continued)

FOREIGN PATENT DOCUMENTS

DE 101 10 988 A1 9/2002

(Continued)

OTHER PUBLICATIONS

International Search Report for International Application No. PCT/EP2004/051751; mailed Nov. 12, 2004.

*Primary Examiner*—Curtis Kuntz
*Assistant Examiner*—Phung-Hoang J Nguyen
(74) *Attorney, Agent, or Firm*—Staas & Halsey LLP

(57) ABSTRACT

A communication link from a first telecommunication device to a second telecommunication device is established via a telecommunication network. Several multimedia objects of a telecommunication user are stored in the second telecommunication device along with a reference number. An allocation map is defined which indicates allocation of a specific call receiver to a specific reference number of a multimedia object. A request is then sent from the first telecommunication device associated with the first telecommunication user to the telecommunication network, the request indicating that a communication link should be established from the first telecommunication device to the second telecommunication device allocated to a selected call receiver. The reference number that is designated to the selected call receiver is determined based on the allocation map, and a call signal is transmitted to the second telecommunication device together with a displayed piece of information in accordance with the determined reference number, whereupon a multimedia object is reproduced by the second telecommunication device according to the displayed piece of information.

9 Claims, 2 Drawing Sheets

U.S. PATENT DOCUMENTS

| | | | |
|---|---|---|---|
| 5,761,279 A | * | 6/1998 | Bierman et al. .......... 379/93.23 |
| 2003/0063730 A1 | | 4/2003 | Woodring |
| 2005/0129190 A1 | * | 6/2005 | Euscher et al. ........... 379/88.13 |

FOREIGN PATENT DOCUMENTS

| | | | |
|---|---|---|---|
| EP | 1 211 875 A2 | | 6/2002 |
| JP | 1289241 | * | 3/2001 |
| JP | 2001-112061 | | 4/2001 |
| JP | 2002-64658 | | 2/2002 |
| JP | 2003-101615 | | 4/2003 |
| WO | 03/073730 A1 | | 9/2003 |

* cited by examiner

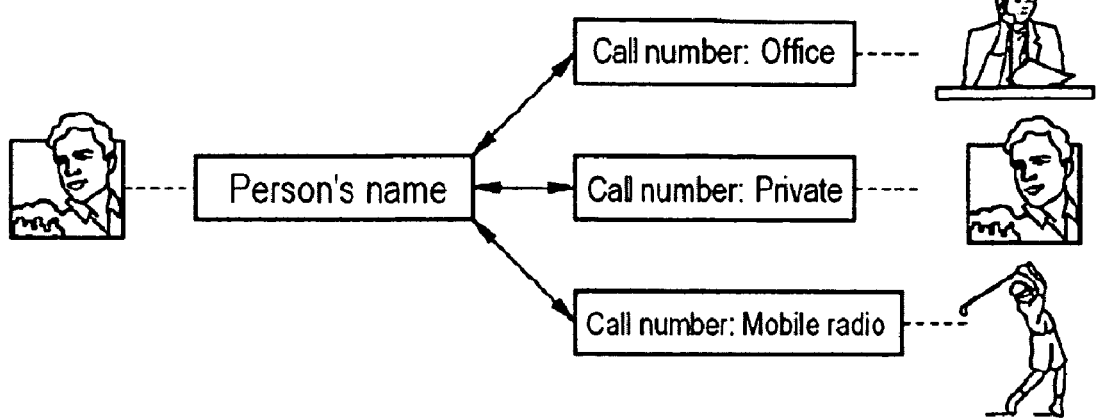
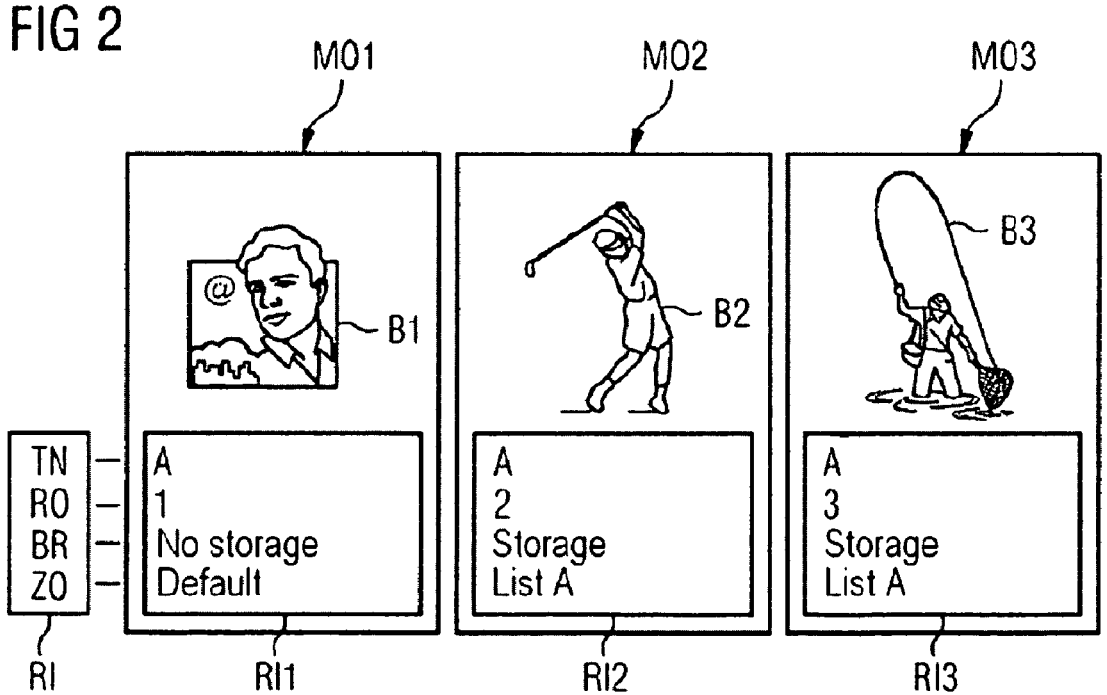

FIG 3
| A | |
|---|---|
| RE | RO |
| C | 2 |
| D | 3 |
| F | 2 |
LA
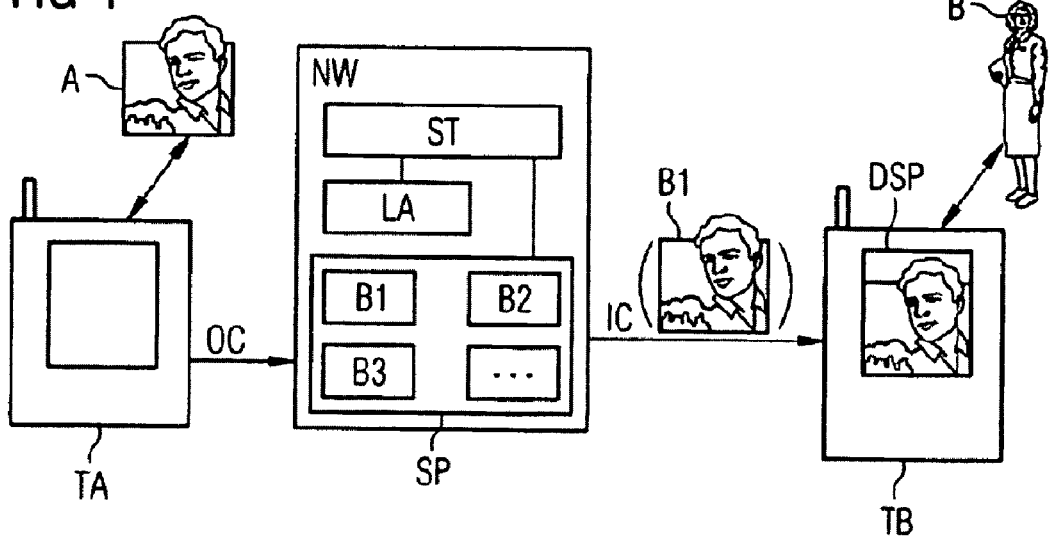
FIG 4
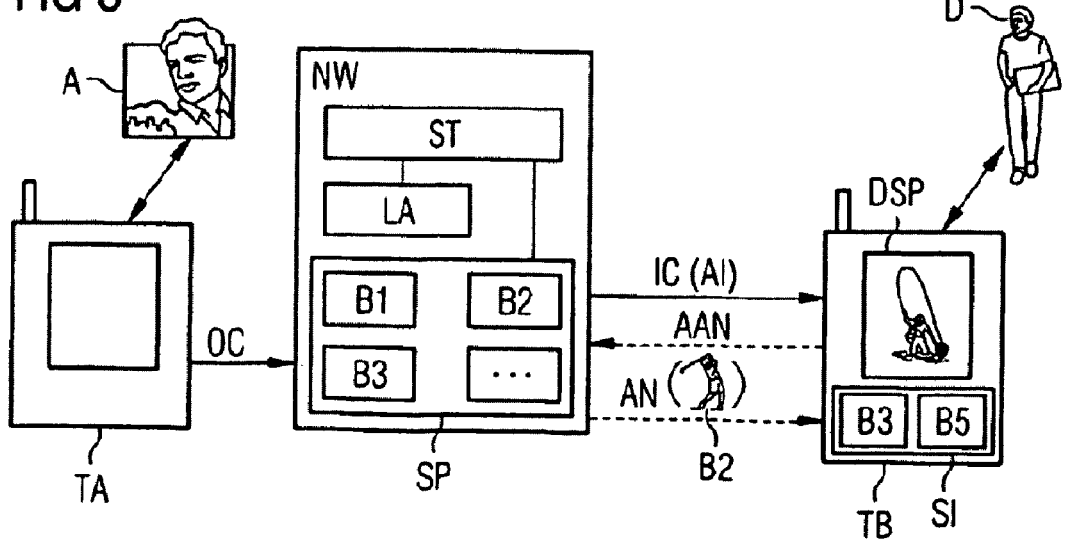
FIG 5

METHOD FOR SETTING UP A COMMUNICATION LINK WITH MULTIMEDIA CALL SIGNALING

CROSS REFERENCE TO RELATED APPLICATIONS

This application is based on and hereby claims priority to German Application No. 103 45 444.6 filed on Sep. 30, 2003, the contents of which are hereby incorporated by reference.

BACKGROUND OF THE INVENTION

1. Field of the Invention

The present invention relates to a method for setting up a communication link from a first to a second telecommunication device via a telecommunication network; it relates in particular to a method wherein data, such as images or tones, of the user of the first telecommunication device is displayed or, as the case may be, played during call signaling at the second telecommunication device.

2. Description of the Related Art

Increasing significance attaches to interpersonal communication by telephony, in particular mobile telephony, with its being important for a telecommunication user particularly while a telephone connection is being set up to know the caller's identity before answering or, as the case may be, accepting the call. The called communication user can for this purpose use various devices for displaying the caller's identity in the form of, for example, that party's name and telephone number. With a first technique, a database in which are stored telephone numbers and associated names, but also an image associated with the name, is provided in the called telecommunication user's telecommunication device. On a call during which the caller's directory number is usually transmitted, the called party's telecommunication device can thus determine the associated name and image of the caller in the database and display that party's image alongside the telephone number and name.

A disadvantage of the method according to the first technique is that the caller is unable himself/herself to influence the image that is stored in the call recipient's telecommunication device and displayed. The display settings and image selecting are here under the call recipient's control; the caller cannot enforce displaying of a particular image or update the displayed image, nor can he/she send the call recipient a recent image.

To resolve the problem so that a caller has control over the image displayed or, as the case may be, requiring to be displayed to the call recipient during call signaling, a second technique also allows the caller to send the image to be displayed to the call recipient from his/her telecommunication device to a telecommunication network that switches the communication link (telephone connection), with the telecommunication network then sending the image to the call recipient's telecommunication device while a call is being signaled. The caller can in this way himself/herself select the image that is to appear to the call recipient. Those for whom this possibility is of particular interest include companies, their being enabled thereby to have their logo displayed to the called user or, as the case may be, call recipient while a connection is being set up. What, however, proves disadvantageous about the method according to the second technique is that each time a connection is set up the caller first has to send an image to a telecommunication network for forwarding to the call recipient's telecommunication device. That places a heavy load on the air interface particularly in the case of a telecommunication device embodied as a mobile telephone and a telecommunication network embodied as a mobile radio network.

SUMMARY OF THE INVENTION

An object of the present invention is therefore to provide a possibility for enabling a communication link to be set up in a resource saving manner whereby the caller is given control over call signaling.

What characterizes a method for setting up a communication link from a first to a second telecommunication device via a telecommunication network according to a first aspect of the invention is that at least one multimedia object (containing an image, tone information, etc.) is now stored on or, as the case may be, in the second telecommunication device together with a respective reference number. This means that a multimedia object, in particular an image, relating to one or more telecommunication users can be provided in, for example, what is termed an electronic telephone book. A plurality of multimedia objects can also be allocated to a single telecommunication user.

To in turn ensure on the caller's part that a specific multimedia object desired by the caller is played to a specific call recipient while a connection is being set up, an allocation map or, as the case may be, allocation table is furthermore defined having at least one data record indicating the allocation of a specific call recipient to a specific reference number of a multimedia object. A desired call recipient is then selected by the caller, in this case by a first telecommunication user allocated to the first telecommunication device. In order to set up a communication link and display the caller's identity to the recipient by, for example, an image, the following operations have to be performed. A connection setup request is sent from the first telecommunication device to the telecommunication network, with the connection setup request indicating that a communication link, in particular a telephone connection, is to be set up from the first to the second telecommunication device, which is allocated to the selected call recipient. The reference number, specified for the selected call recipient, of a multimedia object to be transmitted and played to that party is furthermore determined from the allocation map. Depending on the specific embodiment, the two operations of sending a connection setup request and determining the reference number must herein be performed in different time sequences, as will be explained in more detail below.

Once a reference number has been determined for a multimedia object requiring to be transmitted, a call signal will be transmitted to the second telecommunication device together with display information. The display information includes the determined reference number or is dependent thereon. The reference number can in particular be contained in the display information in coded form. Using a multimedia object's reference number then transmitted to the second telecommunication device, the multimedia object will be played by the second telecommunication device, which is to say an image of the caller will in particular be displayed.

A method offering several advantages is thus provided according to the first aspect: On the one hand the caller has control over the multimedia object to be played to the call recipient; on the other hand the volume of data requiring to be transmitted from the first telecommunication device to the telecommunication network as well as from the telecommunication network to the second telecommunication device is minimized because in each case only reference information or, as the case may be, a reference number for an image to be displayed has to be transmitted and not the entire multimedia object.

According to an advantageous embodiment the allocation map is provided in the first telecommunication device, with, in this case, the reference number of a multimedia object for the selected call recipient being transmitted, having been determined in the first telecommunication device, by the first telecommunication device to the telecommunication network, which then transmits the display information corresponding to the determined reference number to the second telecommunication device.

According to a further advantageous embodiment the allocation map is stored in the telecommunication network in the form of, for instance, a list or table. In this case the operation of determining the reference number takes place finally in the telecommunication network, so that both the storage and the computing requirements in the first telecommunication device are reduced.

To enable a caller to send any call recipient, including one not present in a data record in the allocation map, a specific multimedia object allocated to that recipient, a default multimedia object is defined for call recipients for whom no provision is made in the allocation map. This can be realized in such a way, for example, that if a call recipient is selected for whom there is no data record in the allocation map the determining will provide for feeding out a reference number of a predefined multimedia object as the default reference number.

According to an advantageous embodiment a plurality of multimedia objects of telecommunication users is furthermore stored in the telecommunication network together with a respective reference number, with in particular multimedia objects allocated to the first telecommunication user being stored in the network. Providing multimedia objects, in particular images, of telecommunication users in the telecommunication network can herein be particularly advantageous if the aim is to ensure that the (first telecommunication user's) current multimedia objects are always played in the second telecommunication device. For this purpose, after the display information has been transmitted to the second telecommunication device an operation can be performed of comparing the transmitted display information with a reference number of a multimedia object allocated to the first telecommunication user and stored in the second telecommunication device, with an update request message indicating that the telecommunication network is to transmit a multimedia object corresponding to the display information to the second telecommunication device being returned to the telecommunication network if comparing the display information with the reference number produces a negative result, which is to say if they do not tally. Responding to the update request message, the telecommunication network can then transmit a multimedia object corresponding to the display information to the second telecommunication device.

According to a further advantageous embodiment, in addition to the reference number a telecommunication user's multimedia object stored in the network has further reference information including a storage entitlement indicator indicating whether a telecommunication user's (in particular the first telecommunication user's) multimedia object transmitted to the second telecommunication device is allowed to be stored there or not. A storage entitlement indicator of the type can be of practical advantage for counteracting undesired processing of the multimedia object. In particular when a corporate logo is transmitted within a multimedia object, misuse of the logo can thus be prevented.

According to an advantageous embodiment the first and/or second telecommunication device can be embodied as a mobile radio device, a mobile telephone, a computer having a radio module, or a wired telephone. The telecommunication network can furthermore be embodied as a public fixed telephone network or as a mobile radio network that operates in particular according to the GSM or UMTS standard. If the telecommunication network is embodied as a mobile radio network, then what is termed the HLR (Home Location Register) can be used for storing the allocation map or multimedia objects, or for processing signals or, as the case may be, messages from the telecommunication devices, and for transmitting signals or, as the case may be, messages to the telecommunication devices.

A telecommunication system is furthermore provided which includes a first and second telecommunication device as well as a telecommunication network. The first telecommunication device is therein embodied for setting up a communication link to the second telecommunication device via the telecommunication network according to a method in keeping with the first aspect of the invention.

Proceeding from the case in which a telephone connection is to be set up from the first telecommunication device to the second telecommunication device and in which telecommunication users' multimedia objects have been stored in the second telecommunication device, a connection setup request can be sent as part of a call number conveying process. More precisely, so that the caller (first telecommunication user) can achieve the playing of a specific multimedia object or, as the case may be, the displaying of a specific image to a call recipient (second telecommunication user) when the connection is being set up, the caller's directory number is transmitted with a specific control code (for the multimedia object requiring to be played) from the first telecommunication device to the telecommunication network, which then receives and further processes the received control code. The allocation map, for example, is therein used for the processing, with a further control code or, as the case may be, display or playing information for controlling the multimedia object requiring to be played at the second telecommunication device being appended to the caller's directory number requiring to be transmitted to the second telecommunication device. If the second telecommunication device is able to detect and evaluate the received display information or, as the case may be, playing information, it will then be possible to play the multimedia object desired by the caller. If, however, the second telecommunication device is unable to interpret the directory number expanded to include the display information, then the transmitted directory number will simply be displayed along with the (non-interpretable) control codes for example on a display belonging to the second telecommunication device. The essential feature of the type of signaling lies in the coding of the connection setup request or, as the case may be, of call signaling using backward-compatible control codes in the conveying of the directory number as well as in the second (receiving) telecommunication device's functionality of appropriately selecting and feeding out the entries relating to the conveyed directory number and filed in the second telecommunication device for multimedia objects.

What characterizes a method for setting up a communication link from a first to a second telecommunication device via a telecommunication network according to a second aspect of the invention is that a plurality of multimedia objects, which can have images or tones or, as the case may be, tone information, is stored in the telecommunication network. It is thus possible for a telecommunication user, such as a telecommunication user allocated to the first telecommunication device, to store a plurality of various multimedia objects, in particular images, in the telecommunication network together with a respective reference number. An exemplary manner in which storing or, as the case may be, uploading of the type can be carried out is for the first telecommunication user to place the images on the telecommunication network by his/her first telecommunication device or via the internet by another device such as, for instance, a computer connected to the internet. It is furthermore possible for the telecommunication user to e-mail his/her multimedia objects to the telecommunication network operator so that the operator will file or, as the case may be, store the multimedia objects in the telecommunication network. Uploading can therein take place at any time.

In order now to provide a possibility whereby in each case one specific multimedia object, in particular an image, of a caller is conveyed to different call recipients for the purpose of identifying the caller, an allocation map or, as the case may be, allocation table is defined having at least one data record, with the allocation of a specific call recipient to a specific reference number of a multimedia object being indicated in a respective data record. This means that if a caller (in the example given the first communication user) selects a specific call recipient in order to ring or, as the case may be, call him/her, then the allocation map can be helpful in determining which multimedia object is to be displayed to the call recipient. If the caller or, as the case may be, the first communication user has now selected a specific call recipient, then the following operations will be performed. A connection setup request is sent to the telecommunication network from the first telecommunication device allocated to the first telecommunication user, with the connection setup request indicating that a communication link, in particular a telephone connection, is to be set up from the first telecommunication device to the second telecommunication device allocated to a selected call recipient. Which multimedia object or, as the case may be, reference number allocated thereto has been assigned to the selected call recipient is (as already mentioned) furthermore determined from the allocation map. As will be explained in more detail below, the last two procedures can also be chronologically exchanged. Once the reference number for a multimedia object that is to be played to the selected call recipient has been determined, the multimedia object (which, as mentioned before, has been stored in the telecommunication network) allocated to the reference number will be transmitted from the telecommunication network to the call recipient's second telecommunication device as part of call signaling and played there. It is in particular possible, when this is done, for an image of the caller to be displayed on a display device belonging to the second telecommunication device.

A method of this type has several advantages: On the one hand the caller has control over which multimedia object is played or, as the case may be, displayed to the call recipient; on the other hand only the data link between the telecommunication network and second telecommunication device will be used for the data transportation of multimedia content and not the data link between the first telecommunication device and telecommunication network. Moreover, automatic handling will also feature in the selection of multimedia objects sent to a specific call recipient when the connection is being set up. As already mentioned, the sending a connection setup request and determining the reference number can be performed for a selected call recipient in different time sequences.

According to a first advantageous embodiment the allocation map is present in the first telecommunication device in the form of, for example, a list or table, with, when the reference number of a multimedia object for a selected call recipient has been determined in the first telecommunication device, the determined reference number being transmitted to the telecommunication network, which then transmits the multimedia object allocated to the determined reference number to the second telecommunication device. This means that in this case the reference number will already be determined in the first telecommunication device, with the determined reference number then already being transmitted to the telecommunication network.

According to a second advantageous embodiment the allocation map is stored in the telecommunication network in the form of, for example, a list or, as the case may be, user list, so that the determining the reference number will be performed in the telecommunication network. In the latter case the connection between the first telecommunication device and telecommunication network will furthermore thus also be relieved and computing requirements will be relocated to the telecommunication network.

To take additional account of the eventuality of a connection also requiring to be set up to a call recipient for whom no provision is made in the allocation map, a specific multimedia object allocated to a user is defined as what is termed a default multimedia object that is also to be used for unknown call recipients. Expressed another way, the determining can be embodied such that a reference number of a predefined multimedia object will be fed out as the determined reference number in the event of a call recipient being selected for whom there is no data record in the allocation map. It is thus ensured that every call recipient will be sent a multimedia object allocated to him/her when the connection is being set up.

According to a further advantageous embodiment a multimedia object having a corresponding reference number of the first telecommunication user is furthermore stored in the second telecommunication device, with, in this case, a multimedia object being transmitted from the telecommunication network to the second telecommunication device only if the reference number of the multimedia object stored on the second telecommunication device does not tally with the reference number of the multimedia object requiring to be transmitted. This means it is possible herein to take account of the case in which a multimedia object of a specific telecommunication user (as the caller) has already been transmitted to the second telecommunication device according to an above-described method and the multimedia object, in particular an image, is now already present on the second telecommunication device. If another connection is now to be set up from the same caller to the second telecommunication device, retransmission of the caller's multimedia object from the telecommunication network to the second telecommunication device can in this case be omitted if a multimedia object having the previously determined reference number is already present on the second telecommunication device. The data link between the telecommunication network and second telecommunication device can in this way then be relieved. When a check is carried out to determine whether the correct multimedia object (having the correct reference number) is present on the second telecommunication device, initially only the determined reference number of the multimedia object requiring to be transmitted can be conveyed to the second telecommunication device before a multimedia object is transmitted. After the conveyed reference number has been compared with the reference number of the multimedia object stored in the second telecommunication device, the second telecommunication device can then return a message to the telecommunication network indicating either that the reference numbers tally (so that the multimedia object will not have to be retransmitted to the second telecommunication device) or that the reference numbers do not tally, so that the telecommunication network will need to transmit a multimedia object to the second telecommunication device.

According to a further advantageous embodiment, alongside the reference number the multimedia object of a telecommunication user, in particular the first telecommunication user, is furthermore assigned further reference information including a storage entitlement indicator indicating whether a first telecommunication user's multimedia object transmitted to the second telecommunication device is allowed to be stored there or not. A storage entitlement indicator of this type can be of practical advantage particularly when multimedia objects are transmitted having images containing corporate logos, with storing locally on the second telecommunication device needing to be disallowed in a case like this in order to counteract misuse of the corporate logo.

The first and/or second telecommunication device can be embodied as, for example, a mobile radio device, a mobile telephone, or a computer having a radio module. In the case in which the telecommunication network is embodied as a public fixed network telephone, it is also possible for the first and/or second telecommunication device to be embodied as a wired or, as the case may be, corded telephone. It is furthermore possible for the telecommunication network to be embodied as a public fixed telephone network or as a mobile radio network that operates in particular according to the GSM (Global System for Mobile communication) standard or UMTS (Universal Mobile Telecommunications System) standard. If the telecommunication network is embodied as a mobile radio network, then what is termed the HLR (Home Location Register) can be used for storing multimedia objects and the allocation map or, or for processing signals or, as the case may be, messages from the telecommunication devices, and for transmitting signals or, as the case may be, messages to the telecommunication devices. It is also possible for the telecommunication network to have a plurality of subnetworks one of which is embodied as a fixed telephone network and the other as a mobile telephone network.

A telecommunication system is furthermore provided that includes a first and second telecommunication device as well as a telecommunication network, with the first telecommunication device being embodied for setting up a communication link, in particular a telephone connection, to the second telecommunication device via the telecommunication network according to an above-described method.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a functional block diagram indicating a possibility for allocating images to a telecommunication user;

FIG. 2 is a block diagram of three exemplary multimedia objects that are allocated to a (first) telecommunication user and can be stored in either a telecommunication network or a (second) telecommunication device;

FIG. 3 is a table for an allocation map or, as the case may be, a list for a telecommunication user in which map or list specific further telecommunication users entered as call recipients have been assigned specific reference numbers referencing multimedia objects, such as images, which the call recipient is to play or, as the case may be, display when the connection is being set up;

FIG. 4 is a block diagram of a telecommunication system for explaining the setting up of a communication link, in particular a telephone connection, from a first telecommunication device to a second telecommunication device according to a first embodiment;

FIG. 5 is a block diagram of a telecommunication system for explaining the setting up of a communication link, in particular a telephone connection, from a first telecommunication device to a second telecommunication device according to a second embodiment.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Reference is now made to FIG. 1 which shows two different possibilities for allocating a multimedia object, such as an image, to a user. It is possible, for instance, that (as shown on the left-hand side) a telecommunication user, as the caller, has been allocated a specific multimedia object which is to be played or, in the case of an image, displayed to a call recipient when a telecommunication link is being set up (in telephony, in particular before a voice connection is set up).

It is, however, also possible for the playing or, as the case may be, displaying of a multimedia object to a call recipient to be subject to differentiated handling during connection setup signaling. It is thus possible (as shown on the right-hand side in FIG. 1) for a different multimedia object to be played or, as the case may be, displayed to a communication user depending on the telephone number from which the telecommunication user or, as the case may be, caller is calling. On the other hand it is also conceivable that a call recipient can have different telephone numbers, with each telephone number having been assigned a specific multimedia object of the caller, which object is played or, as the case may be, displayed when a connection is being set up.

It is assumed for simplicity's sake in the following explanation according to FIGS. 2 to 5 that a specific call recipient is to have been allocated a specific multimedia object. As already mentioned, each directory number of the call recipient can, of course, also be allocated a (different) multimedia object which is played to the call recipient during connection setup.

It furthermore needs to be made clear that, in the interest of simple presentation, instead of a multimedia object allocated to a caller the following speaks only of an image allocated to the caller or, as the case may be, telecommunication user, which image is to be displayed to the call recipient when the connection is being set up. Tone information such as, for example, ringtones or other multimedia content can, of course, also be provided in a multimedia object and not just an image.

Examples of telecommunication users' (referred to below as "users" for short) multimedia objects that can be stored in a telecommunication network can be seen in FIG. 2, with its being possible for three multimedia objects MO1, MO2, and MO3 to have been stored for a user A in the network. The first multimedia object MO1 includes an image B1, the second multimedia object MO2 includes an image B2, and the third multimedia object MO3 includes the image B3. The three multimedia objects have also been allocated what is termed reference information Rl. The reference information therein includes the user TN allocated the multimedia objects, a reference number RO, a storage entitlement indicator BR indicating whether or not a multimedia object transmitted to the call recipient is allowed to be stored on the call recipient's telecommunication device, and an allocation indicator ZO indicating for which groups or, as the case may be, selected groups of call recipients the respective multimedia object or, as the case may be, image is to be used for displaying. More precisely, the first multimedia object MO1 has been allocated the reference information Rl1 indicating that the multimedia object MO1 has been assigned to user A, that it has the reference number 1, that (in terms of storage entitlement) the multimedia object MO1 or, as the case may be, the image B1 is not allowed to be stored locally on a call recipient's telecommunication device, and that the multimedia object MO1 or, as the case may be, the image B1 is to be used as the default for call recipients not included in a particular list belonging to user A (see also FIG. 3). The second multimedia object MO2 has been allocated the reference information R12 indicating that the multimedia object MO2 has been allocated to user A, that the multimedia object MO2 has the reference number 2, that storing of the multimedia object on a telecommunication device of a call recipient is allowed, and that the image has been allocated to a specific list of call recipients belonging to user A (again, see also FIG. 3). Finally, the third multimedia object MO3 has been allocated the reference information R13 indicating that the multimedia object MO3 has been assigned to user A, that the multimedia object MO3 has the reference number 3, that local storing on a telecommunication device of the call recipient is allowed, and that the multimedia object MO3 belongs to an allocation list belonging to user A (again, see also FIG. 3).

Reference is now made to FIG. 3 which shows an allocation map or, as the case may be, list LA allocated to a user A. As will be explained with reference to FIGS. 4 and 5, it is possible, for example, for a list of this type to have been stored in a telecommunication network. The left-hand column headed RE includes a list of users as call recipients to whom in the column headed RO specific reference numbers have been allocated for multimedia objects or, as the case may be, images which are to be played or, as the case may be, displayed to a corresponding call recipient when the connection is being set up.

Reference is now made to FIG. 4 which shows a first embodiment of a telecommunication system for implementing a method for setting up a communication link or, as the case may be, telephone connection. The telecommunication system therein includes a first telecommunication device TA, a second telecommunication device B, and a telecommunication network NW which is embodied for switching data or, as the case may be, information or messages between the telecommunication devices TA and TB. The telecommunication network NW is in the present case a mobile radio network connected via an air interface to telecommunication devices TA and TB embodied as mobile telephones. Both the mobile telephones TA and TB and the mobile communication network MW can therein operate according to the GSM (Global System for Mobile communication) standard, the UMTS (Universal Mobile Telecommunications System) standard, or another mobile radio standard.

In the telecommunication network NW is a storage area SP (for example in the network's HLR) in which are stored multimedia objects of telecommunication users, with, as already mentioned, the images B1, B2, and B3 contained in a multimedia object being shown, for simplicity's sake, as representing the object. A list LA is also stored in the network as an allocation map indicating which image having a specific reference number is to be displayed to a specific call recipient when the connection is being set up. A control device ST serves to administer the storage area SP and the LA, as well as to process signals or, as the case may be, messages from the mobile telephones TA and TB and to transmit signals or, as the case may be, messages thereto.

It is now assumed that in a first case user A allocated to the first mobile telephone TA wishes to call a user B via the telecommunication network NW. For this purpose user A or, as the case may be, the mobile telephone TA sends a connection setup request or, as the case may be, an outgoing call message OC to the telecommunication network NW. A check is then carried out therein to determine whether an allocation map or, as the case may be, list LA is available for user A and, if so, whether the call recipient (in the present case) B contained in the connection setup request is included in the list LA (see also FIG. 3). The telecommunication network then detects for user B that the user is not included in the list LA and attempts thereupon to determine a default image that is conveyed to users or, as the case may be, call recipients not included in the list LA. As already mentioned in connection with FIG. 2, the multimedia object MO1 or, as the case may be, the image B1 is defined as the default and is to be used for any call recipients not included in the list LA. As the image B1 has a business correlation with user A, with the corporate logo (in this case the symbol "@") being included, the call recipient, namely user B, is not to be allowed to store the image B1 on his/her mobile telephone TB in order to avoid misuse of the corporate logo. It has in this regard already been mentioned in connection with FIG. 2 that the storage entitlement indicator has been correspondingly embodied in the reference information Rl1 relating to the image B1. If the telecommunication network NW has then determined the image B1 as being the default image, then the image will be conveyed to the mobile telephone TB as part of call signaling or, as the case may be, an incoming call message IC. The image B1 will then be displayed on a display DSP. Call signaling of this type (at a time at which the actual connection or, as the case may be, voice connection has not yet been set up) is usually accompanied at the second mobile telephone TB by an output of sound information or, as the case may be, tone information, what is termed a ringtone, so that user B is made aware of user A's call request. When this is done, either a tone sequence already stored in the mobile telephone TB can be played or corresponding tone information or, as the case may be, ringtone information can be co-sent to the mobile telephone TB with the image B1. This type of co-sending of ringtones has the advantage that user A's request to set up a connection can already be acoustically perceived by user B as being an individual request. User B can, while now being informed about user A's request to set up a connection, view user A's image and consider whether he/she would like to set up a (bidirectional) voice connection to user A by, for instance, pressing a corresponding key for accepting the call.

The present method for setting up a call or, as the case may be, communication link thus has the advantage that user A can, as the caller, determine which image of him/her is to be displayed to user B. It is further advantageous that as a result of specifying an allocation map LA once only user A will not have to bother further with image selection, even if user B or other call recipients are called repeatedly, because the allocation information about the image requiring to be displayed and the call recipient is filed in the network as an allocation map or, as the case may be, list LA.

Reference is now made to FIG. 5 which shows a telecommunication system according to a further embodiment of the invention. The telecommunication system corresponds substantially to the telecommunication system shown in FIG. 4, with its now being a characteristic that images B3 and B5 of users are stored in the second mobile telephone TB, with the images again being assigned a specific reference number.

A communication link or, as the case may be, telephone connection is now again to be set up from user A to a user D via the telecommunication network NW. For this purpose the mobile telephone TA allocated to user A sends a connection setup request or, as the case may be, an outgoing call message OC to the telecommunication network NW, which request or message indicates that a connection is to be set up to user D. The control device ST then processes the connection setup request OC and checks whether user D is included in the list LA (see also FIG. 3) of user As selected call recipients. Regarding user D, the control device ST determines that user D is included in the list LA and that an image having the reference number 3 is to be displayed to the user. To reduce the volume of data transmitted over an air interface from the telecommunication network to the second mobile telephone TB, what is then transmitted from the telecommunication network to the mobile telephone TB is not the image, since in this embodiment of the invention users' images are stored in the mobile telephone TB, but only a reference to the image. A reference can herein contain both the information about the calling user (user A) and the number of the image (specifically the number 2 in this case) allocated to the user. If images are administered only via the telecommunication network NW, it is possible for the network to allocate each image transmitted as part of call signaling according to the invention a unique, possibly coded reference number. In that case the user and a reference number allocated thereto will not have to be explicitly indicated. The unique reference number will suffice.

The reference number, in a form of the kind just explained, is then transmitted as display information AI from the telecommunication network NW to the mobile telephone TB by call signaling or, as the case may be, an incoming call message IC. The mobile telephone TB then checks whether an image corresponding to the display information AI has been stored in the mobile telephone's internal memory SI. In the first case it is then assumed that the image relating to the display information AI has been stored, with the image then being displayed on the mobile telephone's display device DSR While it is being signaled that user A wishes to set up a connection to user D, it is furthermore possible for acoustic information, in particular a ringtone or, as the case may be, ringtones, to be fed out on the mobile telephone TB. Apart from the acoustic signal, a mechanical signal having the form of, for example, a vibration can also be emitted by the mobile telephone TB in order to signal to user D that user A wishes to set up a connection to user D. User D now recognizes user A's image on the display and can decide whether he/she wants to accept user A's call and wishes to establish a (bidirectional) voice connection to user A. If so, he/she will, for example, press a corresponding call acceptance key (not shown) on the mobile telephone TB and thereby accept the call.

A second case will now be considered in which the image corresponding to the display information AI has not been stored in the mobile telephone TB. As a departure from the first case in which the display information AI included a reference to the image B3 stored in the mobile telephone TB, it is now assumed that caller A wishes an image having the reference number 2 to be displayed to user D. In this case, too, it is assumed that the list LA shown in FIG. 3 is accordingly changed in such a way that the call recipient D is allocated the reference number 2. The image having the reference 2 is herein assumed to be stored in the telecommunication network NW (see also FIG. 2 with reference to this). If user A then sends an outgoing call message OC to the telecommunication network NW indicating that user D is to be called, the control device ST will determine from the list LA that an image having the reference number 2 is now to be sent to the call recipient D and will thereupon generate display information AI referencing the image having the reference number 2. As in case 1, the display information is sent by an incoming call message IC to the mobile telephone TB, which then checks whether an image having the reference number 2 is present. However, in the case under consideration no image having the reference number 2 has been stored on the mobile telephone TB so that the mobile telephone TB (shown by a dashed arrow) returns an update request message AAN to the telecommunication network NW in order to indicate that no image having the reference number 2 is present and that the telecommunication network NW is to send a corresponding image (B2, see also FIG. 2 again) to the mobile telephone TB. Responding to the message AAN, the telecommunication network finally transmits the image B2 (again shown by a dashed arrow) to the mobile telephone TB in an update message AN. The image can then be displayed on the display DSP as an image for signaling a connection setup (not shown in the figure). User D can then decide whether he/she wants to accept user A's call and wishes to set up a connection to user A. This is now assumed to take place in the following. After the connection to user A has been terminated, it is possible for the mobile telephone TB to ask user D whether the image B2 transmitted during the updating process is now to be stored locally or whether it is to be discarded. User D can then confirm local storing of the image, whereupon the image B2 will be stored along with its reference information such as, for example, "user A, 2". The image B2 is thus retrievable even without an existing connection to the telecommunication network or, as the case may be, to the first mobile telephone TA and can be used on the mobile telephone TB for instance as part of an electronic appointments calendar or, as the case may be, telephone book. If user A attempts to establish another connection to user D, the ensuing procedural flow will be that according to one of the two cases just presented. If the appropriate image relating to the display information AI is present in the mobile telephone TB during call signaling then the procedural flow will be that according to case 1, whereas if the image referenced in the display information AI is not present on the mobile telephone TB then the procedural flow will be that according to case 2.

If a user A wishes a further image (bedsides the images shown in FIG. 2) of himself/herself to be displayed to his/her friends or acquaintances while a connection is being set up, he/she must first generate or, as the case may be, provide the desired image. He/she must furthermore, as shown in FIG. 2, provide reference information for the new image and finally send the image, along with reference information, to the telecommunication network (for example by e-mailing the network operator). The new image can then be stored in the network as an image having a new, individual reference number. It can, however, also be stored in the telecommunication network under an already existing reference number, with its then replacing an old, already existing image.

Possible call signaling as part of a call number conveying process is briefly described below. For this it is again assumed, as in the case described with reference to FIG. 5, that multimedia objects such as images or ringtone data have been stored in, for example, a kind of telephone book in a call recipient's mobile telephone. Signaling from a calling mobile telephone to the telecommunication network (corresponding to the connection setup request OC) takes place by, for example, SS codes prefixing the called MSISDN (Mobile Subscriber ISDN) (for example:*XX#04912345678). Signaling from the telecommunication network to the call recipient's mobile telephone takes place (as part of call signaling IC) analogously in the conveyed directory number (for example:+49 987654321*3#4) for the calling user's MSISDN, with the reference for a ringtone file 3 and an image 4 furthermore being appended. If the call recipient's mobile telephone also has specific images and ringtone files stored (in the form of, for example, a table) in a telephone book that relate to a directory number, the mobile telephone will then be able when the connection is being set up or, as the case may be, during call signaling from a caller to determine the corresponding ringtone file and image using the telephone book and to play or, as the case may be, display them. A mobile telephone (on the call recipient's side) that does not support signaling in the call number conveying process will during connection setup then only display the control codes at the end of the conveyed called directory number. The flow of operations being unaffected thereby, this form of signaling is backward compatible with the original call number conveying process.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for setting up a communication link from a first telecommunication device to a second telecommunication device via a telecommunication network, comprising:

storing at least one multimedia object in the second telecommunication device, each multimedia object having a corresponding reference number;

specifying an allocation map, having at least one data record, each indicating allocation of a specific call recipient to a specific reference number of a specific multimedia object;

sending a connection setup request from the first telecommunication device allocated to a first telecommunication user to the telecommunication network, which request indicates that a communication link is to be set up from the first telecommunication device to the second telecommunication device allocated to a second telecommunication user;

determining the corresponding reference number for the first telecommunication user when communicating with the second telecommunication user, using the allocation map, said determining being performed in the first telecommunication device or in the telecommunication network;

transmitting a call signal to the second telecommunication device, together with display information that is a function of the corresponding reference number; and playing by the second telecommunication device a corresponding multimedia object, included in the at least one multimedia object stored in the second telecommunication device and matching the corresponding reference number, based on the display information, wherein the allocation map is stored in the first telecommunication device or the telecommunication network, when said determining is performed in the first telecommunication device transmitting, by the first telecommunication device to the telecommunication network, the corresponding reference number of the corresponding multimedia object for the second telecommunication user when communicating with the second telecommunication user, and transmitting of the display information includes the telecommunication network sending the display information that is a function of the corresponding reference number to the second telecommunication device, and said determining provides, in the event of a call recipient being selected for whom there is no data record in the allocation map, a predefined reference number of a predefined multimedia object.

2. The method as claimed in claim 1, further comprising storing a plurality of multimedia objects allocated to the first telecommunication user in the telecommunication network with respective reference numbers.

3. The method as claimed in claim 2, further comprising:

comparing the display information transmitted to the second telecommunication device with any reference number of any multimedia object allocated to the first telecommunication user stored in the second telecommunication device; and transmitting an update request message from the second telecommunication device to the telecommunication network to request a network-stored multimedia object corresponding to the display information if said comparing produces a negative result.

4. The method as claimed in claim 3, further comprising responding to the update request message by transmitting the network-stored multimedia object corresponding to the display information from the telecommunication network to the second telecommunication device.

5. The method as claimed in claim 4, further comprising maintaining a storage entitlement indicator indicating whether the network-stored multimedia object of the first telecommunication user is allowed to be stored at the second telecommunication device.

6. The method as claimed in claim 5, wherein each of the at least one multimedia object includes at least one of an image and tone information.

7. The method as claimed in claim 6, wherein at least one of the first and second telecommunication devices is one of a mobile radio device, a mobile telephone, a computer having a radio module and a wired telephone.

8. The method as claimed in claim 7, wherein the telecommunication network is at least one of a public fixed telephone network and a mobile radio network operating according to at least one of the Global System for Mobile communication and Universal Mobile Telecommunications System standards.

9. A telecommunication system, comprising:

first and second telecommunication devices connected via a telecommunication network, the first telecommunication device setting up a communication link to the second telecommunication device via the telecommunication network using a method in accordance with claim 1.

* * * * *